US006795768B2

(12) United States Patent
Bragansa et al.

(10) Patent No.: US 6,795,768 B2
(45) Date of Patent: Sep. 21, 2004

(54) HANDHELD OBJECT SELECTOR

(75) Inventors: John Michael Bragansa, Hollywood, FL (US); Carlos Antonio Miranda-Knapp, Miramar, FL (US); Wayne Wiggins Ballantyne, Coconut Creek, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/370,397

(22) Filed: Feb. 20, 2003

(65) Prior Publication Data

US 2004/0167707 A1 Aug. 26, 2004

(51) Int. Cl.$^7$ .......................... G01C 21/30; G09G 5/60
(52) U.S. Cl. ....................................... 701/207
(58) Field of Search ................ 701/200–201, 701/205–209, 213–217, 220–221, 224–225, 300–301

(56) References Cited

U.S. PATENT DOCUMENTS

| | | | |
|---|---|---|---|
| 6,070,083 A | 5/2000 | Watters et al. | |
| 6,282,362 B1 | 8/2001 | Murphy et al. | |
| 6,334,087 B1 | 12/2001 | Nakano et al. | |
| 6,377,793 B1 | 4/2002 | Jenkins | |
| 6,381,540 B1 | 4/2002 | Beason et al. | |
| 2002/0052684 A1 | * 5/2002 | Bide | 701/200 |
| 2002/0140745 A1 | 10/2002 | Ellenby et al. | |

OTHER PUBLICATIONS

TALKABOUT® T6320 NiMH Radio, Basic and Highlighted Features, http://commerce.motorola.com/cgi-bin/ncommerce3/ExecMacro/amb_hard_prod.d2w/report.
"Samsung Unveils New Phones At 2002 Olympic Winter Games", Samsung Electronics, Corporate News Jan. 29, 2002, http://www.samsungelectronics.com/news/corporate/com_news_1012783110421_001200.html.
Spec Sheet for Honeywell HMC1002 Magnetic Sensor.
Honeywell Sensor Products 1– and 2–Axis Magnetic Sensors HMC1001/1002, HMC1021/1022, 900248 Rev. B.

* cited by examiner

*Primary Examiner*—Thu V. Nguyen
(74) *Attorney, Agent, or Firm*—Fleit, Kain, Gibbons, Gutman, Bongini & Bianco P.L.

(57) ABSTRACT

An object selection apparatus (100) has a geo-location processor (108) that determines the location of a device (120) at the time of an input by a user. The object selection apparatus (100) also has a bearing determination processor (104) that determines a bearing from the device (120) at the time of the user input. The object selection apparatus (100) also has a geo-content retrieval system (118) that retries information that relates to a set of objects that correspond to the location and bearing of the device (120) that was determined at the time of the input.

13 Claims, 5 Drawing Sheets

HANDHELD OBJECT SELECTOR

TECHNICAL FIELD

The present invention is directed to a system and method for retrieving information, and in particular for retrieving information based upon a user specified geographic location.

BACKGROUND OF THE INVENTION

Information storage and retrieval for businesses and other facilities based upon geographic location is used in many applications. Computer databases that store information about businesses or other facilities also store geographical location (e.g., latitude and longitude) and/or the postal code (e.g., ZIP code) of the business or facility and thereby allow retrieval of information about businesses or facilities according to the geographical location or ZIP code. A user that desires information about a business or other facility in an area is required to either know the ZIP code for that area or the latitude and longitude of a point near the area. Given this information, the computer databases are able to produce a listing of businesses in or near the requested ZIP code, or within a specified distance of a specified latitude and longitude.

Recent advances in geo-location technology, such as GPS receivers, have facilitated determining a latitude and longitude of a user's current location. Given this information, the user is able to query a computer database for information about businesses or other facilities that are within a specified distance of his or her current, or a previously determined, location. This results in a list of businesses or other facilities that are within the specified distance of the user's location. The user is then still required to identify the particular business or facility in which he or she is interested.

Thus, there is a need for solving the problems with the prior art as described above, and in particular for an improved method of identifying objects, such as businesses or other facilities, so as to facilitate retrieval of information about a specific business or facility.

DETAILED DESCRIPTION

The features and benefits of the present invention are described through the exemplary embodiment of a handheld portable device that functions as a cell phone for wireless voice and data communications as well as a handheld portable device that is used to select objects and display information about the selected object. Alternative embodiments of the present invention include handheld devices that perform only data communications that are associated with the present invention as well as embodiments that internally store all data associated with the functioning of the present invention in the handheld portable device itself and therefore do not require external data communications.

Figure 1:
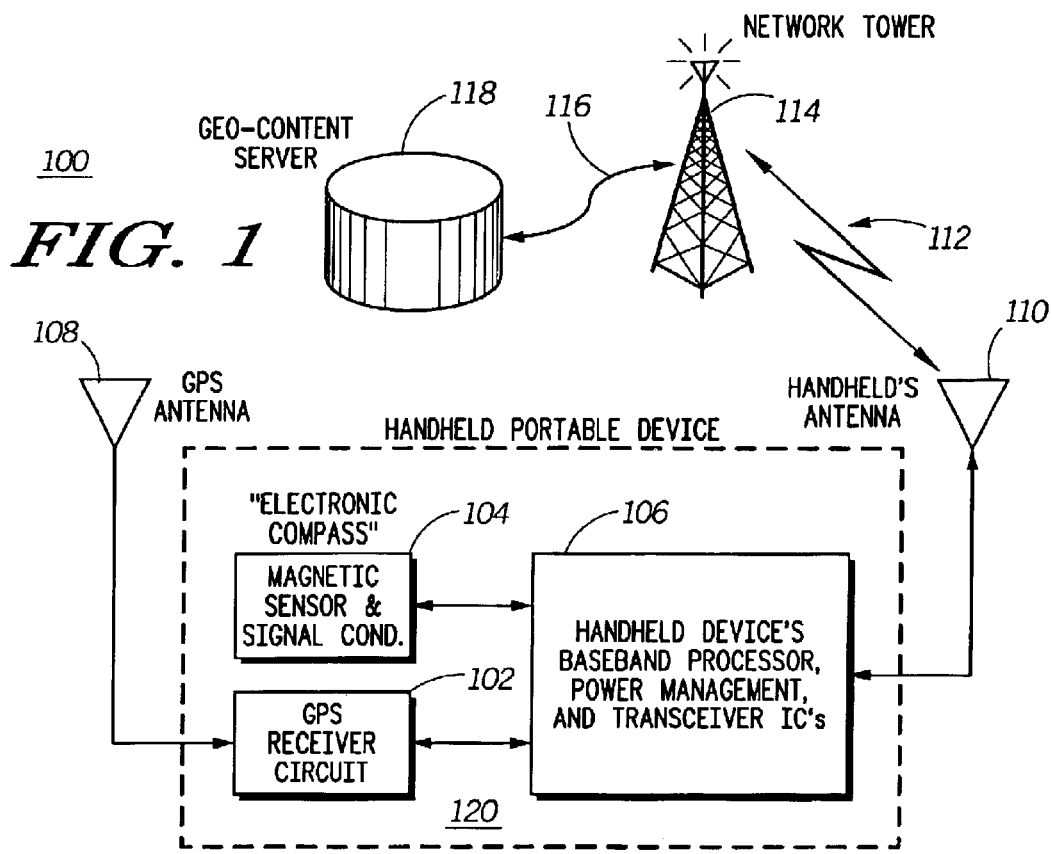
FIG. 1 is a block diagram of the operational components of a handheld object selector, in accordance with an exemplary embodiment of the present invention.

A block diagram of the operational components 100 of an exemplary embodiment of the present invention is illustrated in FIG. 1. The elements of the operational components 100 include a handheld portable device 120, which operates as an object selector in the exemplary embodiment, that includes a baseband processor, power management and transceiver IC's module (BBPM Module) 106. The handheld portable device 120 further contains a GPS receiver circuit 102 that serves as a geo-location processor that is used for determining a location of the handheld portable device 120. The handheld portable device 120 also contains an electronic compass 104 that serves as a bearing determination processor for determining a bearing from the device. The GPS receiver 102 is electrically connected to GPS antenna 108. The electronic compass 104 of the exemplary embodiment is the Honeywell HMC1002 Magnetic Sensor, available from Honeywell, Incorporated, of Morristown, N.J., USA. The electronic compass 104 of the exemplary embodiment is aligned with the handheld portable device 120 so that "pointing" the handheld portable device 120 in a direction results in the electronic compass 104 reading that direction. Alternative embodiments of the present invention have the direction of the electronic compass offset from the orientation of the handheld portable device 120 and therefore the alignment of the handheld portable device 120 and electronic compass 104 have a known relationship but is not required to be identical.

The BBPM module 106 is connected to a handheld's antenna 110. The BBPM module 106 is described below and performs control processing for the handheld portable device, and performs baseband and RF processing to support the voice and data communications functions of the handheld portable device 120. The voice and data communications to and from the handheld portable device 120 are carried by an RF link 112 to a network tower 114. Data communicated between the handheld portable device 120 that relates to the geographically selected data query and retrieval are communicated between the network tower 114 and a geo-content server 118 via a communications link 116. Communications link 116 is able to include any of a variety of communication link components, such as combinations of wired communications links and wireless communications links including line of sight and/or satellite communications links. Embodiments of the present invention alternatively use various communications media and techniques for voice and data communications, such as optical, infra-red, and wireless satellite communications links.

Figure 2:
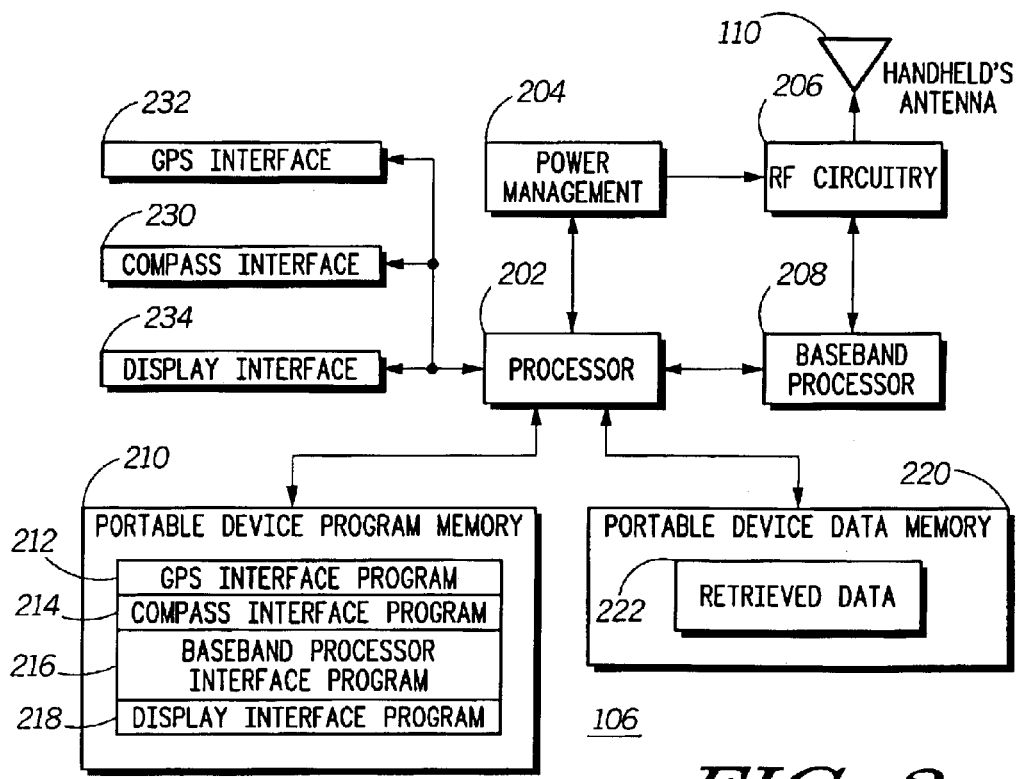
FIG. 2 is a block diagram of a baseband processor and a power management and transceiver IC's module, as used by an exemplary embodiment of the present invention.

An exemplary block diagram of the baseband processor and power management and transceiver IC's module (BBPM module) 106 as is utilized by the exemplary embodiment of the present invention is illustrated in FIG. 2. The BBPM module 106 of the exemplary embodiment contains a processor 202 that performs the processing associated with the present invention in the exemplary embodiment. The BBPM 106 of the exemplary embodiment also contains a power management module 204 that controls operation of energy consuming devices such as the other components of the BBPM 106 and other components of the handheld portable device 120. The BBPM 106 further has RF circuitry 206 to perform wireless data communication over the wireless link 112 via the handheld's antenna 110. The baseband processor 208 of the exemplary embodiment performs the processing that allows data communications over the wireless link 112 by accepting and providing baseband information from and to the RF circuitry 206. The data to be communicated are exchanged between the processor 202 and the baseband processor 208. The BBPM 106 further contains hardware interfaces to provide for control and communications between the BBPM 106 and various devices within the handheld portable device 120 of the exemplary embodiment. These interfaces include a GPS interface 232 for communications with the GPS receiver circuit 102, a compass interface 230 for communications with the electronic compass 104, and a display interface 234 for communications with a user display of the handheld portable device 120, as is described below. The GPS interface 232 of the exemplary embodiment utilizes a serial data interface that is compliant with the RS-232 interface definition. The display interface 234 of the exemplary embodiment utilizes a parallel data interface. The compass Interface 230 of the exemplary embodiment uses an A/D converter that is incorporated into either the power management IC 204 or the processor 202 and that directly monitors the analog output of the electronic compass 104 in order to produce a digital signal for input to the processor 202. The compass interface 230 of the exemplary embodiment further includes a power control for the electronic compass 104 that disables power to the electronic compass 104 under the control of the processor 202 when the electronic compass is not in use.

Alternative embodiments include other devices that are either within the handheld portable device 120 or attached to the handheld portable device 120. Other embodiments of the present invention also utilize other serial data interfaces, parallel data interface and other electrical interfaces that are used by the various devices within or connected to the handheld portable device 120.

The BBPM 106 of the exemplary embodiment includes a portable device program memory 210 and a portable device data memory 220. Portable device program memory 210 of the exemplary embodiment includes a GPS interface program 212 that controls operation of the GPS interface 232, a compass interface program 214 that controls operation of the compass interface 230, and a baseband processor interface program 216 that controls operation of the baseband processor 208. The baseband processor interface program 216 of the exemplary embodiment also controls and manages the data communications between the portable handheld device and the geo-content server 118 via the RF link 112. The portable device program memory 210 also contains the display interface program 218 that controls the data displayed on the user display 302 of the portable device. The portable device data memory 220 of the exemplary embodiment contains retrieved data 222, which includes data that has been retrieved by the external geo-content server 118 and that is to be displayed by the display interface program 218.

Figure 5:
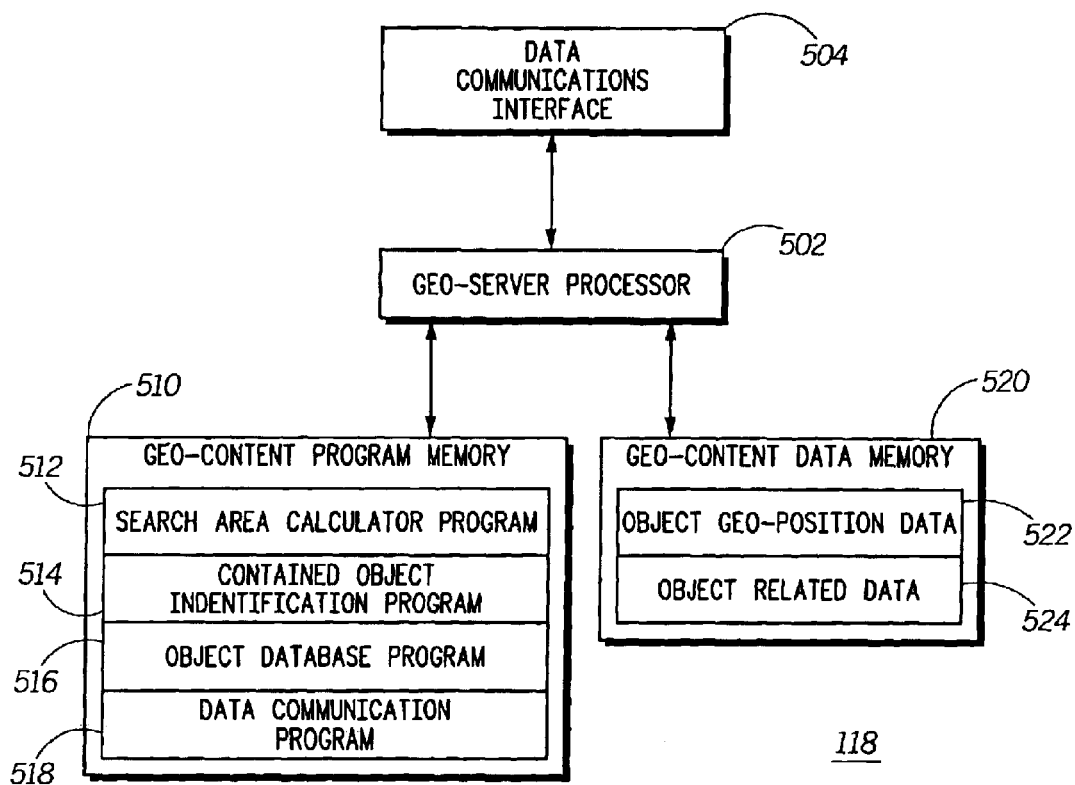
FIG. 5 is a block diagram of a geo-content server, in accordance with an exemplary embodiment of the present invention.

A block diagram of an exemplary geo-content server 118 as utilized by the exemplary embodiment is illustrated in FIG. 5. The geo-content server 118 of the exemplary embodiment contains a geo-server processor 502 that performs processing associated with the present invention. The geo-content server 118 is used for retrieving information relating to a set of objects that correspond to the determined location and bearing from the portable handheld device 120. The geo-content server 118 further contains a data communications interface 504 that connects the geo-content server 118 to the communications link 116. Alternative embodiments of the geo-content server contain direct wireless communications interfaces. Examples of an application that uses a direct wireless communication interface to a geo-content server 118 include using handheld portable devices 120 that communicate with the geo-content server 118 via a wireless local area network that is based upon the IEEE 802.11 protocol.

The geo-content server 118 of the exemplary embodiment contains a geo-server program memory 510 and a geo-server data memory 520. The geo-server program memory 510 of the exemplary embodiment contains a search area calculator program 512 that implements a search area calculator by directing the processing of the geo-server processor 502 in order to determine search areas as are described below. The geo-server program memory 510 of the exemplary embodiment contains a contained object identification program 514 that implements a contained object identifier by directing the processing of the geo-server processor 502 so as to determine if objects are contained within the search area that is determined by the search area calculator program 512. The geo-server program memory 510 of the exemplary embodiment further contains an object database program 516 that maintains a database within the geo-server data memory 520 that contains data about objects that can be retrieved by the exemplary embodiments of the present invention. The object database program 516 of the exemplary embodiment stores the geographic location of each object that is stored in that database as well as other data that is related to each object in that database. Objects in the exemplary embodiment include businesses and other facilities. The object database program 516 of the exemplary embodiment supports retrieval of data by range of geographic location of the objects and also by other parameters. The geo-server program memory 510 of the exemplary embodiment also contains a data communication program 518 that controls the processing to perform communications through the data communications interface 504 and ultimately the wireless data link 112 of the exemplary embodiment. Data communicated via the data communications interface 504 under the control of the data communication program 518 includes received data that contains location and bearing data that are received from handheld portable devices 120. The data communicated by the data communications interface 504 also includes transmitted data that contains retrieved object data that is related to objects that correspond to the location and bearing that was received.

Figure 3:
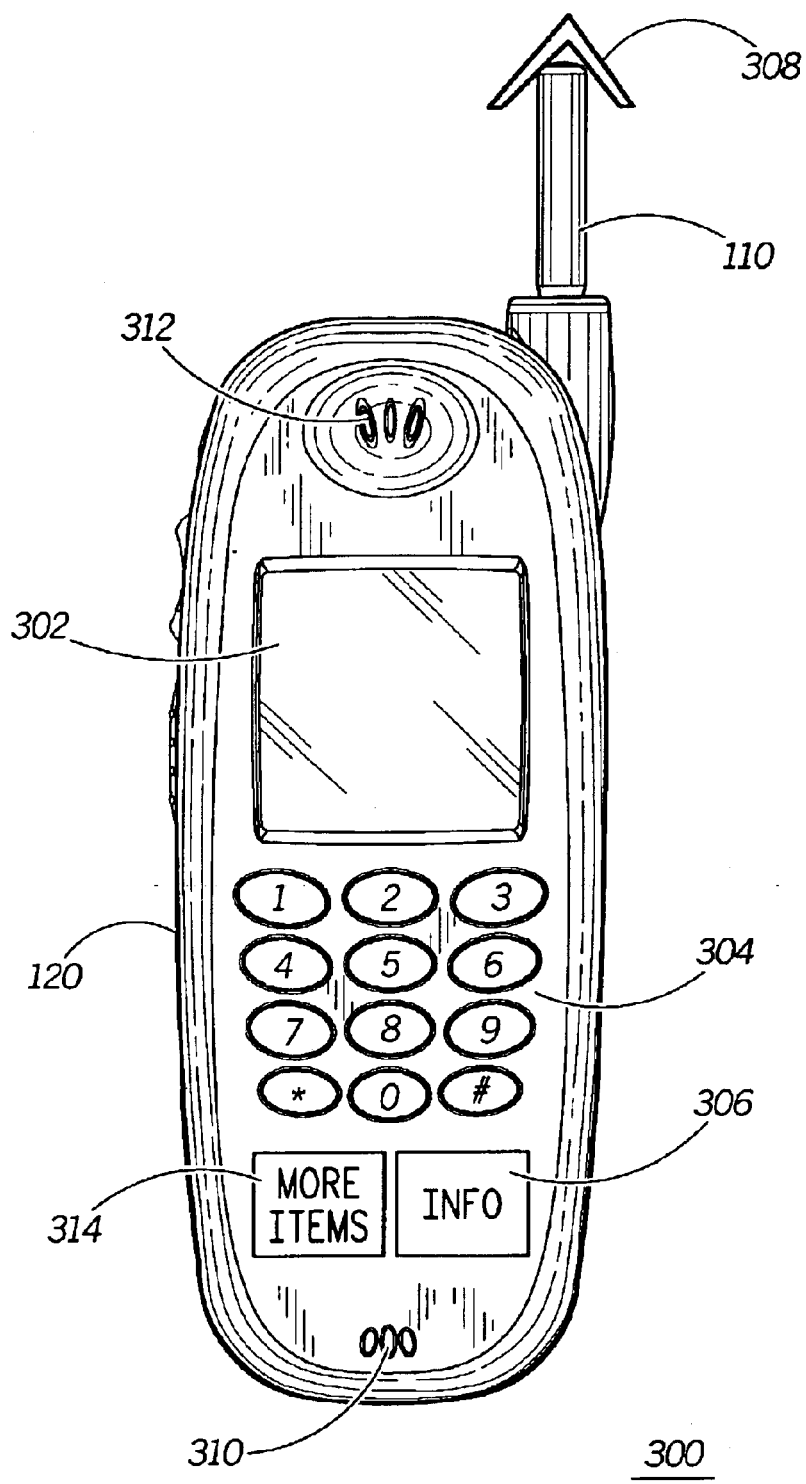
FIG. 3 is an operator view of a handheld portable device, in accordance with an exemplary embodiment of the present invention.

An operator view 300 of a handheld portable device 120 as is used by the exemplary embodiment of the present invention is illustrated in FIG. 3. The operator view 300 shows an operator display screen 302 that is used to display alpha numeric and graphical data to the operator. The operator view 300 further shows a numeric keypad 304 that is similar to a telephone keypad. The numeric keypad 304 of the exemplary embodiment is used for numerical data entry and can also be used to enter alpha-numeric data by assigning different alpha numeric values to different number of key presses of each key, as is commonly used in cellular phones and other data entry from telephone keypads. The operator view 300 also shows the earpiece speaker 312 and microphone 310 that allows the handheld portable device 120 of the exemplary embodiment to be used for bi-directional voice communications.

The operator view 300 shows the handheld's antenna 110. The handheld's antenna 110 is used to perform voice and data communications with the network tower 114. The handheld's antenna 110 of the exemplary embodiment further includes an arrowhead 308 to provide a visual aid to the operator in "pointing" the portable handheld device 120 at an object. The antenna 110 and arrowhead 308 of the exemplary embodiment serve as the alignment shape in the exemplary embodiment. Alternative embodiments of the present invention incorporate an alignment shape either printed upon or attached to the portable handheld device 120 to act as an aid in pointing the handheld portable device 120 at an object. The alignment shape is aligned with the embedded compass such that the compass produces a bearing output that corresponds to the direction in which the alignment shape is pointed or the compass produces an output with a determined offset from that bearing. Embodiments that use a portable handheld device 120 with an internal antenna 110 include a printed or otherwise indicated alignment shape to aid the operator in pointing at the object of interest.

The operation of the exemplary embodiment of the present invention includes having the operator point the portable handheld device 120 at an object that the operator wishes to "select" for the purpose of an automated application that the operator is using. In order to "select" an object in the operation of the exemplary embodiment of the present invention, the operator points the handheld portable device 120 so that the antenna 110 and arrowhead 308, i.e., the alignment shape, are pointing towards the desired object. The operator then provides an input by, for example, pressing the "info" button 306. Pressing the "info" button 306 causes the processing of the portable handheld device 120 to determine the geo-position of the portable handheld device 120 and to read the electronic compass to determine the bearing along which the operator is pointing the device from that position. The geo-position is obtained from the GPS receiver circuits 102 in the exemplary embodiment. Alternative embodiments utilize other geo-location processors that include means to determine location within a building or another defined area. Other embodiments of the present invention utilize geo-location processors that are based on triangulation and/or time difference of arrival processing of one or more transmitted signals. The handheld device's location can be determined by processing within the handheld portable device or location can be determined by equipment that is external to the handheld portable device 120 and communicated back to that device. This position and bearing pair is read in the exemplary embodiment from the respective device by the processor 202 of the BBPM 106 of the exemplary embodiment, formatted into an appropriate data message and transmitted to the geo-content server 118 via the wireless link 112, network tower 114 and communication link 116.

Once the geo-content server 118 of the exemplary embodiment receives the position/bearing pair, the processing of the geo-content server 118 performs the function of a geo-content retrieval system and identifies a set of objects that correspond to the received position/bearing pair. The geo-content server 118 of the exemplary embodiment identifies the set of objects by creating search areas that correspond to the position/bearing pair and then identifying objects that are known to be contained within that search area. These identified objects are then the set of objects that correspond to the determined location and bearing of the handheld portable device 120.

Figure 4:
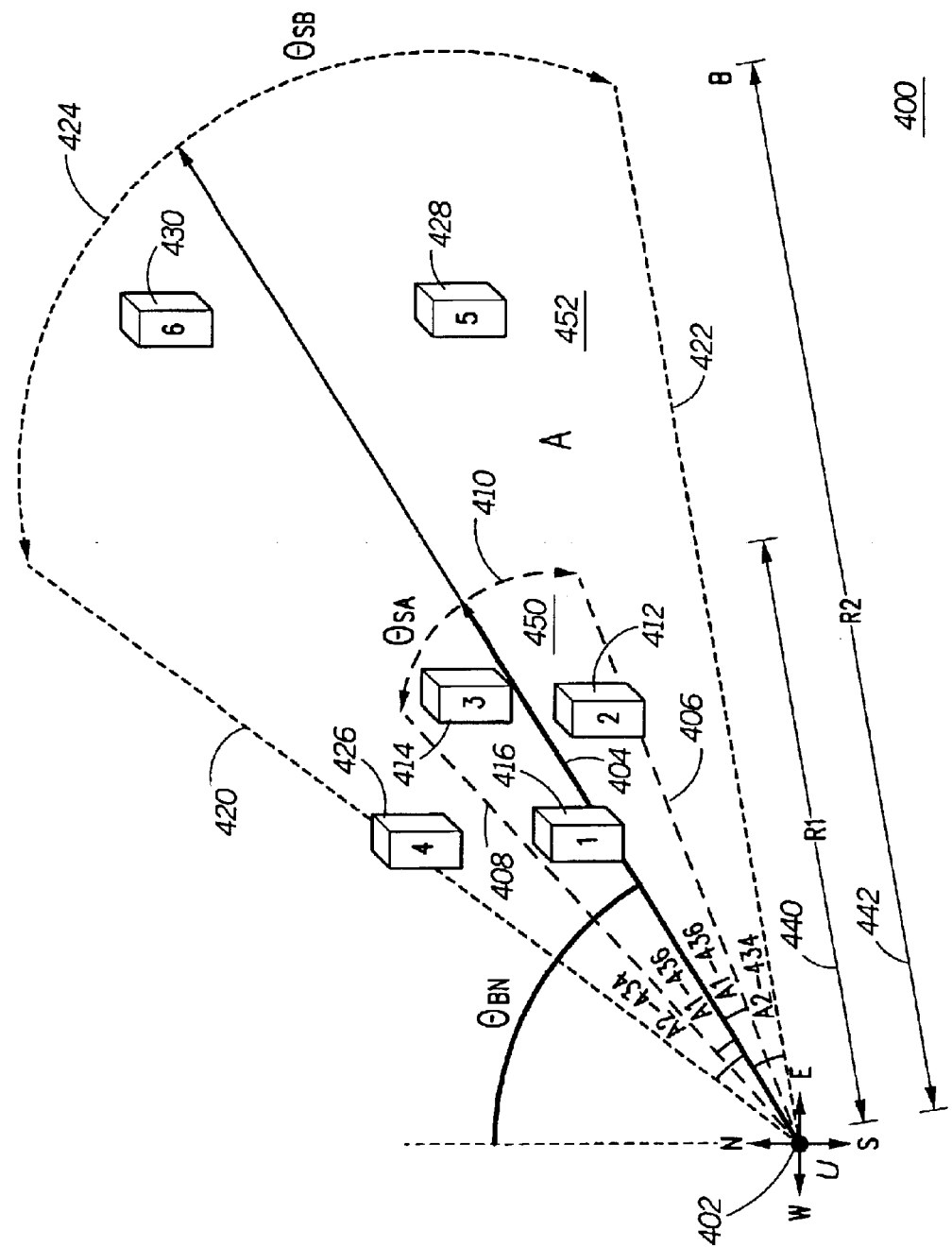
FIG. 4 is an illustration of search cones, as used by an exemplary embodiment of the present invention.

A pair of exemplary search cones 400 as are used in the exemplary embodiment of the present invention is illustrated in FIG. 4. The exemplary search cones 400 illustrate the location 402 of the handheld device at the time the user presses the "info" button 306 in order to initiate the geo-content server information retrieval. The bearing passed to the geo-content server 118, i.e., direction in which the device was pointed when the "info" button 306 was pressed, is shown as bearing vector 404 in the exemplary search cones 400. In order to determine the search area, the geo-content server 306 of the exemplary embodiment determines an initial Clockwise (CW) bearing vector 406 and an initial Counterclockwise (CCW) bearing vector 408. The exemplary embodiment uses a fixed angular offset from the bearing vector 404 in order to determine the initial CW bearing vector 406 and the initial CCW bearing vector 408. The region between the initial CW bearing vector 406 and initial CCW bearing vector 408 is the initial guess that is made by the processing of the exemplary embodiment as to the angular area of interest of the user of the handheld portable device 120. The processing further uses an assumed initial radius R1 440 from the location 402 to form an initial arc 410 between the initial CW bearing vector 406 and the initial CCW bearing vector 408. The initial radius R1 440 of the exemplary embodiment is selected so as to include the area immediately adjacent to the location 402 and sufficiently far so as to include objects of interest. The initial search area 450 is the area enclosed by the initial CW bearing vector 406, the initial CCW bearing vector 408 and the initial arc 410. The processing of the exemplary embodiment then searches for objects known to be in this initial search area 450. In the exemplary search cones 400, object 1 416, object 2 412 and object 3 414 are found to be located in the initial search area 450 bounded by the initial CW bearing vector 406, the initial CCW bearing vector 408 and the initial arc 410. The processing of the exemplary embodiment then retrieves data stored in association with these three objects and transmits it, via communications link 116, network lower 114 and RF link 112 back to the handheld portable device 120. Information about the objects within this set of objects is then displayed to the operator on the operator display 302.

If the operator determines that the set of objects displayed in the operator display 302, i.e., the objects within the initial search area 450, does not contain the object for which information is desired, the operator presses the "more items" button 314 of the exemplary embodiment. A data message is then sent to the geo-content server 118 to indicate that the operator wishes more objects that correspond to the location and bearing previously transmitted. In the exemplary embodiment, this is probably due to a determination that the desired object is not contained within the set of objects returned by the geo-content server 118. In response to this request, the processing of the geo-content server 118 of the exemplary embodiment determines a second search area 452. The processing of the exemplary embodiment of the present invention determines the second search area 452 by first determining a second CW bearing vector 422, a second CCW bearing vector 420 and a second arc 424 located at a radius R2 442. The exemplary embodiment determines a second CW bearing vector 422, a second CCW bearing vector 420 by adding a second fixed angular offset to the bearing vector 404. Embodiments of the present invention select the second fixed angular offset value to be either larger or smaller than the initial angular offset value, depending upon the ergonomics and application for which the embodiment is utilized.

The second search area in this example is the area bounded by the second CW bearing vector 422, the second CCW bearing vector 420 and the second arc 424 but which excludes the initial search area 450. The initial search area 450 is either partially or wholly contained within the boundaries of the second search area 452 depending upon the relationship between the initial angular offset 436 and the second angular offset 434, and the relationship between R1 440 and R2 442. The geo-content server 118 then searches for objects within the second search area 452. In the exemplary search cones 400, object 4 426, object 5 428 and object 6 430 are found to be in this second search area. The geo-information server 118 of the exemplary embodiment then forwards information about these objects to the handheld portable device 120 for display on the operator display 302. Embodiments of the present invention are able to include or exclude objects within the initial search area 450 when reporting the objects that are determined to be within the second search area 452, as is desired for the particular application of the embodiment.

The exemplary embodiment utilizes one initial angular offset 436 that is used to determine both the initial CW bearing vector 406 and the initial CCW bearing vector 408. A second angular offset 434 is similarly used to determine both the second CW bearing vector 422 and the second CCW bearing vector 420. Alternative embodiments are able to use different offset values to determine these bearing vectors, i.e., one offset value to determine the CW bearing vector and another offset value to determine the CCW bearing vector. Information about objects in the exemplary embodiment is stored according to latitude and longitude of the objects. The geometry of the search cones 400 described above is then converted to latitude and longitude by the exemplary embodiment prior to searching the database for objects using the equations described below.

The search area used by the exemplary embodiment is defined by the following equations. In these equations, the User's GPS Location is given by NX°, WY°; where NX° and WY° are the cardinal components of the handheld's GPS location.

The "Pointed To" Bearing is given by $\theta_{BN}°$, which corresponds to the angle measured with the electronic compass.

The location of the "Pointed To" object is given by NX°+x°, WY°+y°; where x° and y° are the incremental components of the coordinates of the "pointed-to" object relative to the location of the user.

Since
$Sin(\theta_{BN})$=Terrestrial component of Long/R
$COS(\theta_{BN})$=Terrestrial component of Lat/R
where R is the distance to the pointed-to object.

It is true that:
The terrestrial component of Long=$(sin\ \theta_{BN})R$
The terrestrial component of Lat=$(cos\ \theta_{BN})R$ Therefore, for Longitude coordinates, the arc-length (or "Terrestrial component of Long" as described above) per degree of Longitude varies as a function of the Latitude coordinate. The reason for this is that the Longitudinal lines all meet at the geographical North and South Poles, and thus the spacing between them is greatest at the equator and narrows down to zero at the poles. Therefore, the following conversion factors are used:

Arclength of Latitude=111,120 meters/degree Latitude
Arclength of Longitude=111,120*cos(Latitude [in degrees])/degree Longitude Therefore, the Incremental $\theta_{lat}$ (x°) and Incremental $\theta_{long}$ (y°) are computed as follows:

x°=Incremental $\theta_{lat}$=$(cos\ \theta_{BN})R/(111,120\ [meters])$
y°=Incremental $\theta_{long}$=$(sin\ \theta_{BN})R/(111,120\ [meters])*cos$ (Latitude [in degrees])

Finally, the "Pointed To" location is computed by the exemplary embodiment as:

Lat=NX°+$(cos\ \theta_{BN})R/(111,120\ [meters])$
Long=WY°+$(sin\ \theta_{BN})R/(111,120\ [meters])*cos$ (Latitude [in degrees])

Where:
X and Y are the GPS cardinal components of the user's wireless device
$\theta_{BN}$ is the orientation of the wireless device during the pointing event In these equations, R is the magnitude of the "pointed to" vector. In an embodiment, R is adjusted by the Geo-content server 118 by adding three (3) meters in each increment until there are three objects within the database that fall within the search cone. Some embodiments don't require the objects to fall exactly on the bearing vector; they are selected by the "least squares" method instead.

Figure 6:
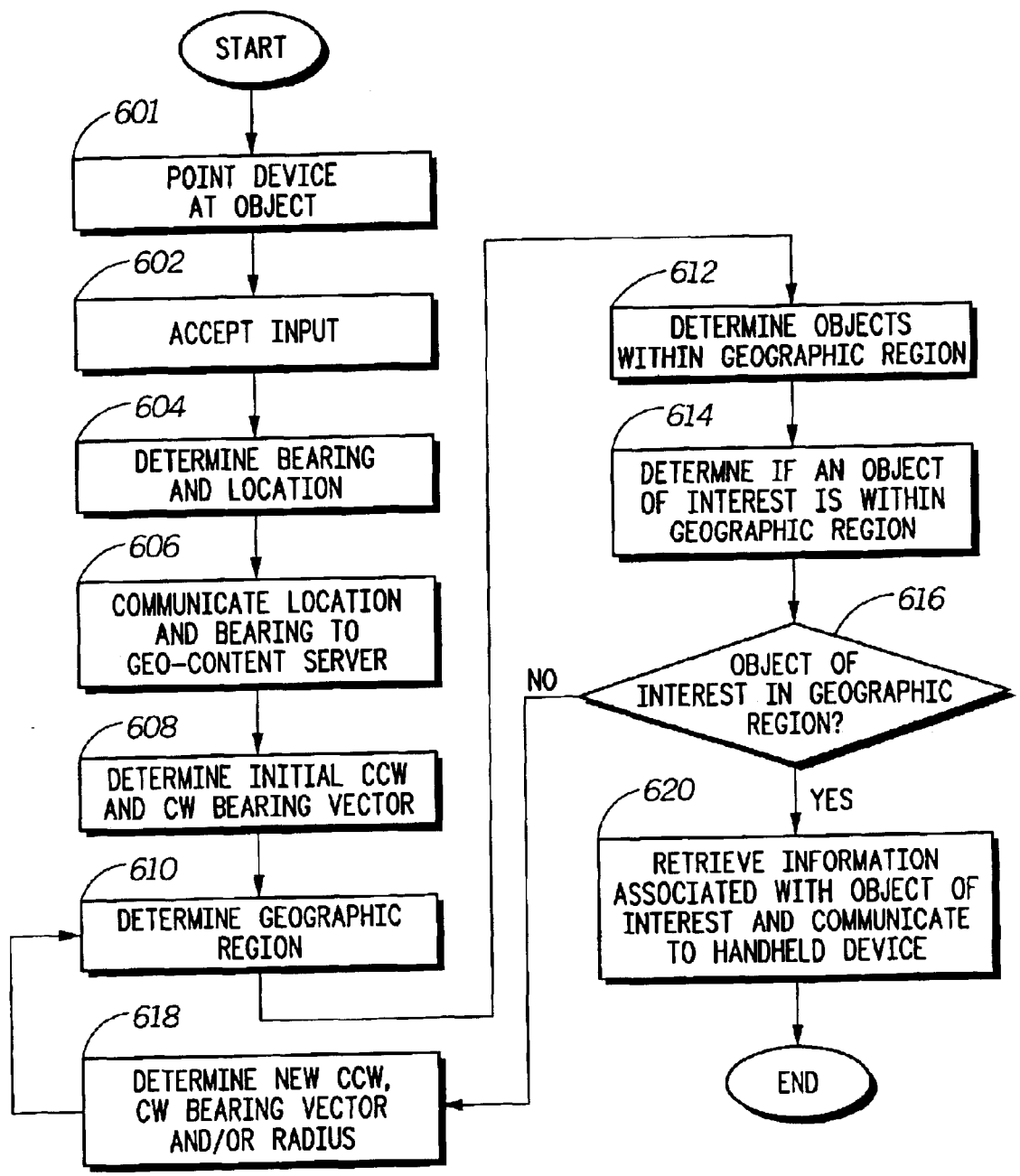
FIG. 6 is a top level processing flow diagram, in accordance with an exemplary embodiment of the present invention.

A top-level processing flow diagram 600 of the exemplary embodiment of the present invention is illustrated in FIG. 6. The processing of the exemplary embodiment begins with the user pointing, at step 601, the handheld portable device at an object of interest to the user. The processing then performs the step of accepting, at step 602, an input from the user at a handheld portable device 120. The input in the exemplary embodiment is a key press of the "Info" key 306. The processing then proceeds by determining, at step 604, the location and bearing of the handheld portable device 120. The location is determined in the exemplary embodiment by the GPS receiver circuit 102. Alternative embodiments determine location by other methods. The bearing of the handheld portable device 120 is determined in the exemplary embodiment by an electronic compass 104. This determined bearing allows determination of the direction in which the handheld portable device is pointing, as is described above. The processing proceeds by communicating, at step 606, the determined location and bearing to the geo-content server 118. The exemplary embodiment utilizes the wireless link 112, network tower 114 and the communications link 116 to communicate the determined location and bearing to the geo-content server 118. Alternative embodiments utilize other communications techniques, such as infra-red communications links or satellite communications links.

Once the determined location and bearing are received by the geo-content server 118 of the exemplary embodiment, the processing advances to determine the search area in which to look for objects with data stored within the geo-content server 118. The processing of the exemplary embodiment determines, at step 608, an initial CCW bearing vector 408 and an initial CW bearing vector 406, as are described above. The processing then advances to determine, at step 610, a geographic region in which to search. The initial geographic region in the exemplary embodiment is bounded by the initial CCW bearing vector 408, the initial CW bearing vector 406, and the initial arc 410, as is described above.

Once a geographic area is determined, the processing of the exemplary embodiment proceeds by determining, at step 612, objects that are within the determined geographic region. The processing of the exemplary embodiment performs this step in the geo-content server that retrieves a set of objects with related data that is stored within the geo-server data memory according to latitude and longitude ranges that are within the determined search area. All objects with a latitude and longitude that are within the search area are retrieved to form a set of objects. The processing of the exemplary embodiment then advances to determine, at step 614, if an object of interest is contained within the set of objects that are determined to be within the geographic region. The exemplary embodiment performs this step by communicating a description of the objects contained within the set of objects to the handheld portable device 120, which displays this list to the user on the display 302. If the user identifies an object on the display that is the object of interest, the user selects that object and an object of interest is determined to be within the set of objects. If the user does not see an object of interest within the set of objects displayed on display 302, i.e., determines that the desired object is not contained within the set of objects, the user presses the "more items" button 314. This indicates that an object of interest is determined to not be within the set of objects within the current geographic search region.

If an object of interest is determined, at step 616, to be within the set of objects, the processing of the exemplary embodiment continues by retrieving, at step 620, information about the object of interest and that data is communicated to the handheld portable device. The processing of the exemplary embodiment caused an identification of the object of interest, as selected by the user of the handheld portable device 120, to be communicated to the geo-content server 118. The geo-content server 118 then retrieves data related to the object of interest, and communicates that data back to the handheld portable device for display on the display 302.

If an object of interest is determined, at step 616, to not be within the set of objects, a new search area is determined, as is described above. The new search area of the exemplary embodiment is determined, in a second iteration for example, by determining a second CW bearing vector 422, a second CCW bearing vector 420 and a second arc 424 located at a radius R2 442, at step 618, as are described above. Once these new perimeters are determined, the processing proceeds by determining, at step 610, a geographic search region based upon these new perimeters. The processing then continues as is described above for the new search area. Each time it is determined, at step 616, that an object of interest is not contained within the retrieved set of objects, the exemplary embodiment determines a new CW bearing vector and/or a new CCW bearing vector, according to the configuration of the exemplary embodiment, until an object of interest is selected or the search is cancelled by the user.

The exemplary embodiments of the present invention utilize a handheld portable device 120 that communicates location and bearing to a geo-content server 118. The exemplary embodiment then has the geo-content server 118 retrieve information that is communicated back to the handheld portable device 120. Alternative embodiments incorporate the functionality of the geo-content server 118 into the handheld portable device 120 and thereby obviate the use of the wireless data link 112 for communications of location, bearing and object information. Other embodiments divide the geo-content functionality among several geo-content servers and between the handheld portable device 120 and one or more geo-content servers.

The exemplary embodiment is well suited for use by a pedestrian or mobile user who is traveling in a city and desires information about a business or other facility. The user of the exemplary embodiment only has to point a handheld device at the business or other facility in which he or she is interested and press the "INFO" button 306. The operation of the exemplary embodiment results in information about the business or other facility being displayed to the user on the display 302 of the handheld device. An example of such information includes a menu for a restaurant that the user is able to view by simply pointing the handheld portable device 120 of the exemplary embodiment and pressing the "INFO" button 306. Other information includes movie titles and show times for a movie theater, the hours of operation, the hours of operation of a business and the telephone number of a business. A retrieved telephone number for a business can be used in some embodiments to facilitate directly calling the business by simply pointing a handheld portable phone at the business.

The exemplary embodiment of the present invention offers the advantage of being able to select an object by physically pointing a handheld portable device 120 at the object. Once the object is selected, the exemplary embodiment retrieves information about that object and presents it to the user.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method comprising the steps of:
   determining a location of a device at a time of an input from a user;
   determining a bearing from the device at the time;
   determining a search area, the search area bounded by a clockwise bearing vector, a counterclockwise bearing vector and a radius, the clockwise bearing vector and counterclockwise bearing vector offset from the bearing;
   determining a set of objects that lie within the search area;
   determining if a desired object is contained within the set of objects;
   in response to a determination that the desired object is not contained within the determined set of objects, increasing the search area by changing at least one of the clockwise bearing vector and the counter clockwise vector; and
   retrieving information relating to a set of objects that correspond to the determined location and bearing of the device.

2. The method according to claim 1, wherein the step of retrieving comprises the step of transmitting the location and the bearing to a geo-content server.

3. The method according to claim 1, wherein the determining a bearing comprises:
   pointing a handheld device, wherein the handheld device has an alignment shape and an embedded compass and wherein the embedded compass is aligned with the alignment shape; and
   determining the bearing as reported by the compass.

4. The method according to claim 3, wherein the alignment shape comprises an antenna attached to the handheld device.

5. The method according to claim 1, wherein the step of determining if a desired object is contained within the set of objects and the step of increasing are repeated until the desired object is determined to be within the set of objects.

6. The method according to claim 1, wherein the determining if a desired object is contained within the set of objects comprises accepting an input from a user, the input indicating one of that the desired object is contained within the set of objects and that the desired object is not contained within the set of objects.

7. An object selector comprising:

a geo-location processor for determining a location of a device at a time of an input from a user;

a bearing determination processor for determining a bearing from the device at the time; and a search area calculator for determining a search area, the search area bounded by a clockwise bearing vector, a counterclockwise bearing vector, and a radius and wherein the clockwise bearing vector and the counterclockwise bearing vector are offset from the bearing;

a contained object identifier that determines if a desired object is contained within the set of objects and causes, in response to a determination that the desired object is not contained within the set of objects, the search area calculator to change at least one of the clockwise bearing vector and the counter clockwise vector so as to change the size of the search area;

a geo-content retrieval system for retrieving information relating to a set of objects that correspond to the determined location and bearing of the device.

8. The object selector according to claim 7, wherein the geo-content retrieval system comprises:

a wireless link; and a geo-content server, wherein the geo-content server communicates the information relating to the set of objects via the wireless link.

9. The object selector according to claim 7, wherein the bearing determination processor comprises:

an alignment shape; and an embedded compass, wherein the embedded compass is aligned with the alignment shape.

10. The object selector according to claim 9, wherein the alignment shape comprises an antenna attached to the handheld device.

11. The object selector according to claim 7, wherein the contained object identifier repeatedly determines if the desired object is contained within the set of objects, and while the desired object is not contained within the set of objects, causes the search area calculator to change at least one of the clockwise bearing vector and the counter clockwise vector so as to change the size of the search area.

12. The object selector according to claim 7, further comprising a user input that accepts an input from a user, the input indicating one of that the desired object is contained within the set of objects and that the desired object is not contained within the set of objects, and wherein the contained object identifier determines if a desired object is contained within the set of objects in dependence upon the input.

13. A computer program product, the computer program product comprising computer instructions for a device performing the steps of:

determining a location of a device at a time of an input from a user;

determining a bearing from the device at the time;

determining a search area, the search area bounded by a clockwise bearing vector, a counterclockwise bearing vector and a radius, the clockwise bearing vector and counterclockwise bearing vector offset from the bearing;

determining a set of objects that lie within the search area;

determining if a desired object is contained within the set of objects;

increasing, in response to a determination that the desired object is not contained within the set of objects, the search area by changing one of the clockwise bearing vector and the counter clockwise vector; and retrieving information relating to a set of objects that correspond to the determined location and bearing of the device.

* * * * *